(No Model.) 3 Sheets—Sheet 1.

L. S. CHICHESTER.
WATER AERATOR.

No. 417,664. Patented Dec. 17, 1889.

Witnesses
Alfred Gartner
E. L. Sherman

Inventor
Lewis S. Chichester,
By his Attorneys (No Model.) 3 Sheets—Sheet 3.

L. S. CHICHESTER.
WATER AERATOR.

No. 417,664. Patented Dec. 17, 1889.

Witnesses
Alfred Gartner
E. L. Sherman

Inventor:
Lewis S. Chichester,
By his Attorneys,
Drake & Co.

UNITED STATES PATENT OFFICE.

LEWIS S. CHICHESTER, OF NEWARK, NEW JERSEY, ASSIGNOR TO CARROL P. BASSETT, OF SAME PLACE.

WATER-AERATOR.

SPECIFICATION forming part of Letters Patent No. 417,664, dated December 17, 1889.

Application filed October 1, 1888. Serial No. 286,859. (No model.)

*To all whom it may concern:*

Be it known that I, LEWIS S. CHICHESTER, a citizen of the United States, residing at Newark, in the county of Essex and State of New Jersey, have invented certain new and useful Improvements in Water-Aerators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to more perfectly and thoroughly aerate water or to supply or mix it with oxygen from the atmosphere prior to the passage of said water to the main supply-pipes leading to the consumer, to enable the water to be aerated in large quantities, and to enable it to be done with the least expenditure of power and labor.

The invention consists in the improved aerating mechanisms and in the arrangements and combinations of parts, substantially as will be hereinafter described, and finally embodied in the clauses of the claims.

Figure 1:
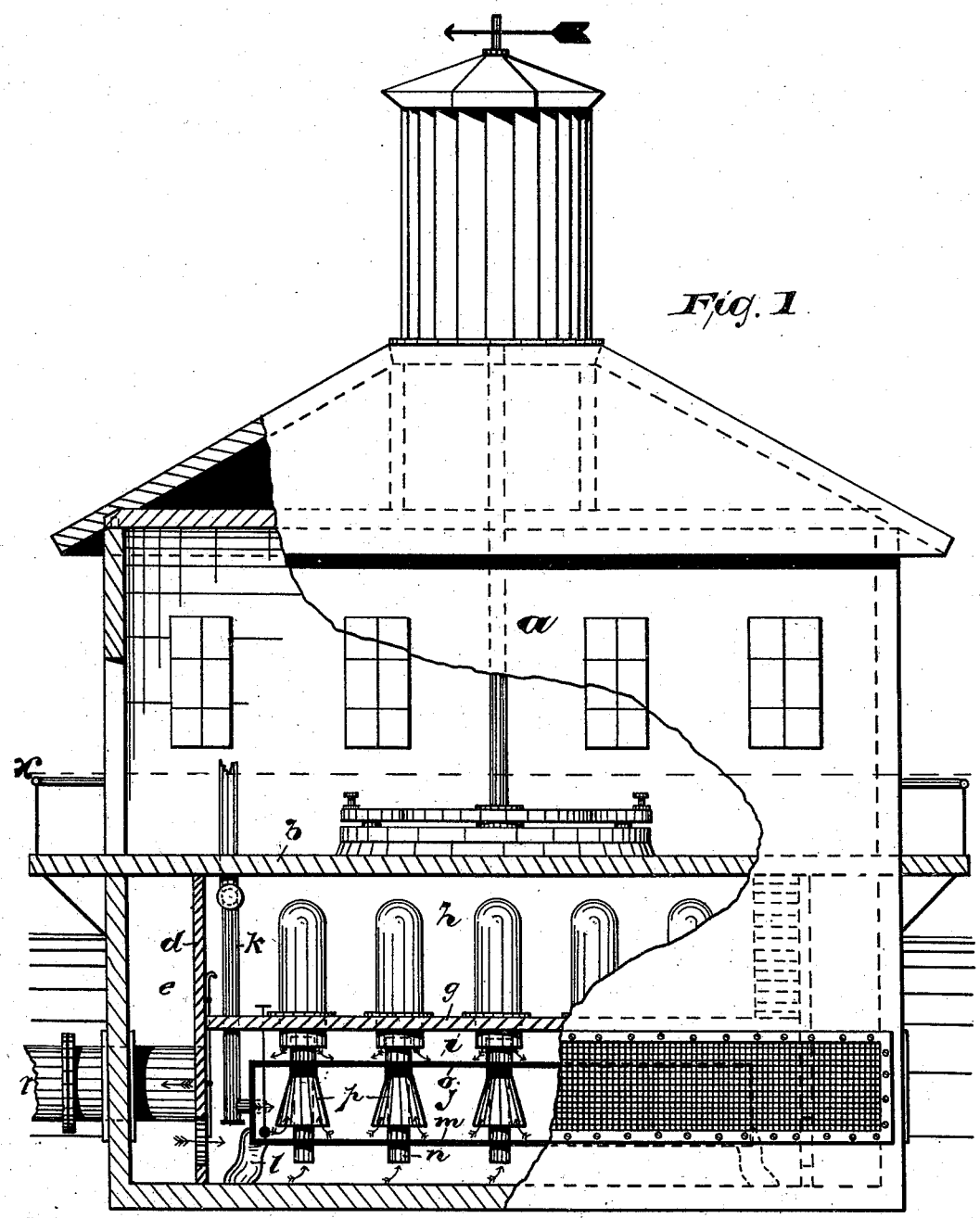
Figure 2:
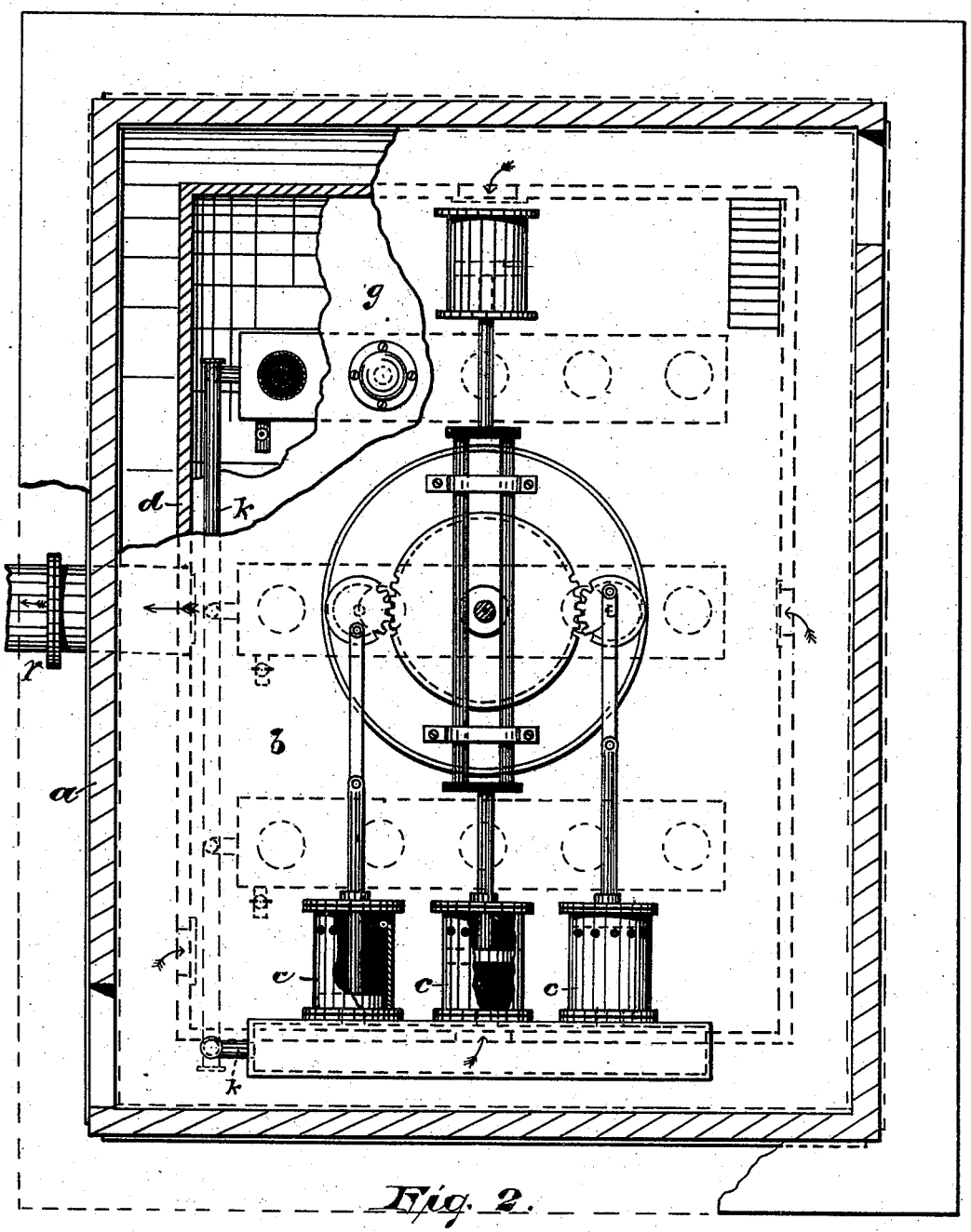
Figure 3:
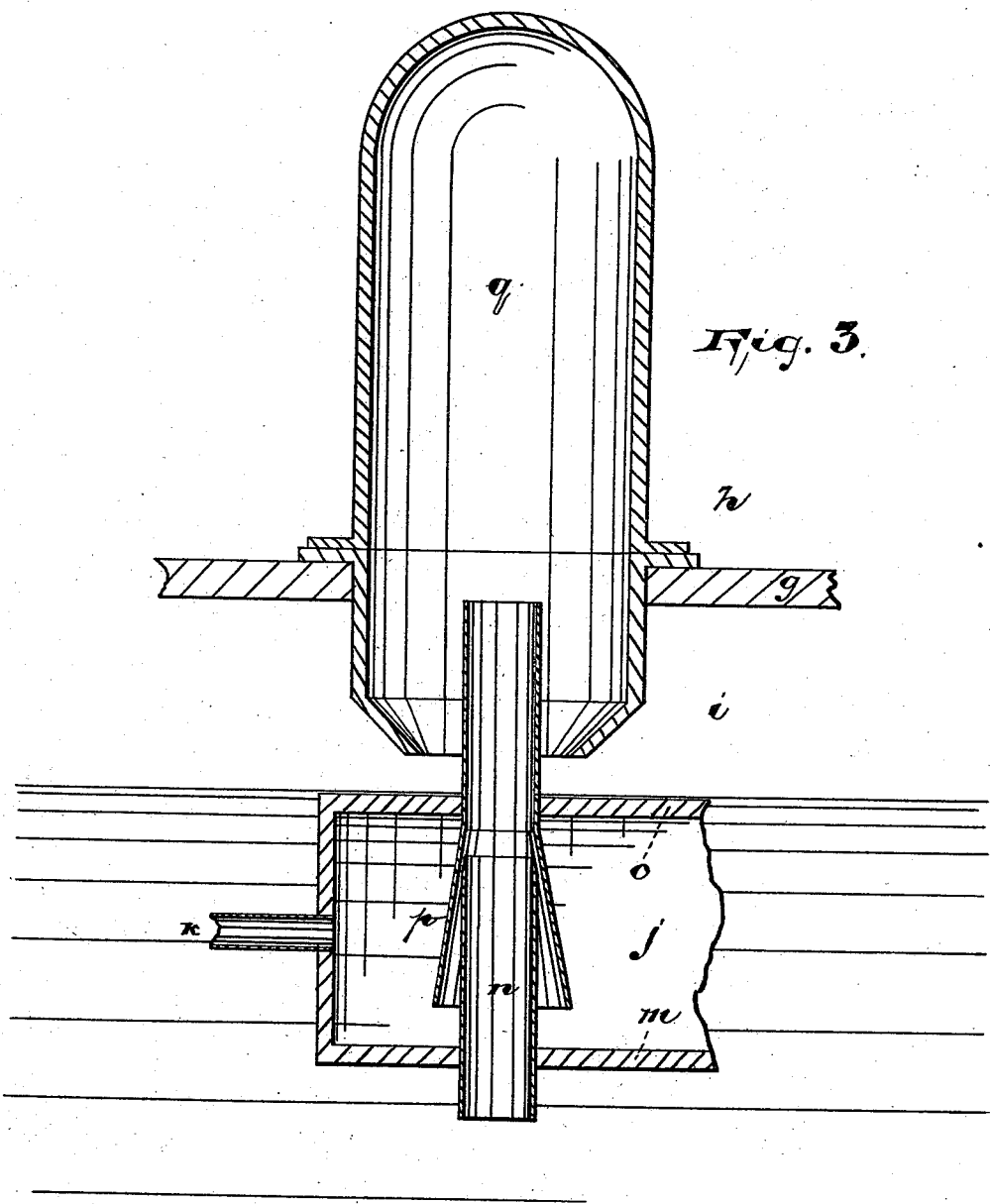

Referring to the accompanying drawings, embraced in three sheets, in which like letters indicate corresponding parts in each of the figures, Figure 1 is an elevation of an aerating structure embodying my improvements, and partly broken away and in section to show the internal arrangements of parts; and Fig. 2 is a sectional view taken on line $x$, and showing more particularly the arrangements of means for transmitting power to the pumps employed in forcing the air into contact with the water. Fig. 3 is a vertical sectional view in detail of an ejecting device for mixing air and water.

In said drawings, $a$ indicates a structure of sufficient size to properly hold the parts hereinafter referred to, said structure being, preferably, in the form of a floating vessel capable of adapting itself to the varying depths of water, so that the inlets thereto may be kept at a point where it is found that the water is purest, say from three to five feet below the surface and ten feet above the bottom of the reservoir. I do not, however, wish to be understood as limiting myself to a floating structure, though under certain circumstances such an arrangement or construction is deemed more desirable. The said structure $a$ consists, preferably, of a large building, the interior chamber of which is or may be divided at a point above or near the water-line with a flooring $b$, above which the pumps $c\ c\ c$, motive mechanism, &c., may be disposed, and below which the aerating-chambers may be built. Below the said flooring $b$ the area is preferably subdivided by inner partitions $d$, and the area within said partitions $d$ is again subdivided by a horizontal partition $g$, forming an upper inspection-chamber $h$ and a lower water-chamber $i$, which latter is open at suitable points to the outer chamber $e$, formed by the partition $d$. The water-chamber $i$ contains one or more compressed-air chambers $j$, which are preferably formed so that the water may flow over and beneath the same, so as to gain access to certain ejector tubes or ducts, such as will be described. Said compressed-air chambers $j$ are connected by a suitable pipe or duct $k$ with the air-pumps $c$, above referred to, or with other suitable air forcing or compressing mechanisms, and said air-chambers may be supported in position in the chamber $i$ by suitable legs or supports $l$ in any manner desirable.

Although I deem the construction shown the more desirable, it will be obvious that the partitions above referred to may be arranged or disposed otherwise than described, and in some cases may be dispensed with, and I do not, consequently, wish to be understood as limiting myself to the construction specified.

Through the lower partition or wall $m$ of the compressed-air chamber $j$ are arranged a series of tubular sections $n$, which extend upward through the said chamber $j$, as indicated in Fig. 3. The said tube or pipe $n$ is open at both ends, so that the water of the chamber $i$ is free to flow through said tubes under the influence of gravity and the air forced through outer sleeves or jacket $p$, arranged around each of said tubes $n$, as indicated in Figs. 1 and 3. The said pipes, sleeves, or jackets are open at their lower ends to the compressed-air chamber $j$, so that the compressed air may enter and flow up between the inner and outer tubes or pipes. Said outer tube, pipe, or sleeve projects above the upper wall or partition o of the compressed-air chamber and extends into the water-chamber i.

As the water flows upward through the tubes or pipes n and issues therefrom the air surrounding the same at said point of issue serves to give impetus to its upward movement, so that a fountain effect is secured, the water being broken into spray, and thus a large surface is brought into contact with air under pressure.

Over the ejectors formed by the jacketed tubes or pipes n are arranged bell-glasses q, into which the air and water are forced, and the latter is again broken against the inner walls of said glasses and flows downward, and thus is given further opportunity for absorbing the compressed air. As a result, the water, when it arrives in a position to flow into the water-main r, is thoroughly impregnated or mixed with the air, and the latter flows with the water into the pipes, where it remains until drawn off with the water by the consumer. Thus the water is given life or sparkle, and all organic matter is thoroughly oxygenated.

The ejector-pipes, where they extend above the wall o, project into the bell-glasses a little distance, and thus, should the water in the water-chamber rise above the level of the said ejector pipes or tubes, the level within the said glasses will be held below the level of the pipes or tubes by pneumatic pressure, as will be understood. Thus the water will be prevented from running into the said compressed-air chamber.

The bell-glasses, while they may be made of any suitable material to accomplish the results above described, are preferably of glass or other suitable transparent material, and thus the attendant in the inspection-chamber may readily observe whether the water and air are in proper motion within the glasses or not. If the latter be the case, proper means are provided for regulating the flow of either the water or the air, or both.

The aerating tubes or pipes are so disposed in the water-chamber as that the body of water as it passes through said chamber is forced into spray over and over again before it is allowed to pass into the supply-mains r, leading into the city.

To economically supply the power by means of which the pumps or air-compressors are operated, I have arranged, in connection with the structure a, a wind wheel or mill s, of any suitable construction. This operates a driving-shaft t, having a cog-wheel u. Said cog-wheel actuates cogged crank-wheels v v, which in turn actuate pump-pistons w w, working in connection with pump-cylinders a' a'. From the pump-cylinders the air is forced into a common chamber b', and from thence into the pipe k, connecting with the compressed-air chambers below the flooring g.

To provide for a greater demand for compressed air, when such is needed, than can be supplied by the wind mills or wheels, I employ an additional pump c', which may be operated by steam-power derived from steam in the cylinder d', which may be connected with or a part of any ordinary engine. Thus, should the wind force be insufficient to supply adequate power, I may employ steam either in addition to or in lieu of the wind-power; but ordinarily the wind-power will be sufficient to secure complete aeration. The pump and steam-cylinder rods e' f' may find bearings on the bed-plate g' in any suitable manner.

The quantity of water passing into the water-chamber i may be regulated and controlled or prevented from entering said chamber by means of a suitable valve or valves h', which may be operated from the inspection-chamber or from elsewhere, and should I desire to empty the compressed air-chamber, should water leak into the same, it may be accomplished by means of a suitable cock or valve i', which may be controlled also from inspection-chamber. The air-pipes may be provided with valves to regulate the flow of air into the compressed-air chambers.

The air may be filtered before passing to the pumps to remove insects, germs, or other deleterious matter in any suitable manner.

I am aware that a system of pipes has been connected with an air-pump arranged on a float for forcing air into a water-reservoir for the purpose of aerating and purifying the water. Such a combination of devices I do not herein claim. In my improvements the water of the said reservoir is supplied with air as it passes therefrom to the water-mains, the water and air remaining together under pressure while in said pipe or main.

Having thus described the invention, what I claim as new is—

1. The floating water-aerating device herein described, combining with a float connecting with the water-mains of a city or town, an aerator adapted to force air into the water in its passage through the float to the said mains, substantially as and for the purposes set forth.

2. The improved water-aerating device for reservoirs, combining a structure a, connecting with the water-main r, and provided with a water-chamber open to receive the water from the reservoir outside of said structure, an air-chamber and an air pump or compressor connected therewith, and pipes or ducts for bringing the water and compressed air into contact before they enter the water-mains, and said water-main connecting with said air-chamber and arranged and adapted to conduct the mixed and compressed air and water to the consumer, substantially as and for the purposes set forth.

3. The floating water-aerating device combining therein a float having air and water chambers, a wind-wheel carried by said float, a pump connected with said wind-wheel and forcing air into said air-chamber, tubes or pipes for bringing the water and air together and forming a spray, and suitable pipes or tubes for conveying the air-impregnated water from said float, substantially as and for the purposes set forth.

4. The water-aerator herein described, combining therein suitable partitions adapted to and forming an air-chamber and a water-chamber, and tubes or pipes, one of which is open to the water-chamber at its inlet end and the other of which is open to the air-chamber at its inlet end, the opposite ends being adjacent to eject the water and air together to produce a spray, an air-compressor, and means, as described, for operating the same, said parts being arranged and adapted to operate substantially as and for the purposes set forth.

5. An aerating-structure having a connection with the water-main of a city, and having a compressed-air chamber and a water-chamber, a tube open to allow the passage of water therethrough, and a tube or pipe arranged in connection with said water-tube and open to said compressed-air chamber, and a pump for forcing air into said compressed-air chamber, substantially as and for the purposes set forth.

6. In combination, a structure having a water-chamber and a compressed-air chamber, a jacketed tube adapted to spray water and air, as described, and means for compressing the air, substantially as and for the purposes set forth.

7. In combination, in a water-aerator having water and air chambers, an air-tube and a water-tube, one arranged within the other, and means for forcing said water and air together from said tubes, and a bell-glass, said parts being arranged and combined substantially as and for the purposes set forth.

8. The improved aerating device herein described, combining with a structure $a$, provided with a flooring $b$, partitions $g\ e$, forming an inspection-chamber $h$, water-chambers $e$ and $i$, and compressed-air chambers formed within said water-chamber $i$, air-compressors $c$, and means for actuating the same, ejector tubes or pipes, and bell-glasses covering the ends of the same, all said parts being arranged and combined substantially as and for the purposes set forth.

9. A floating water-aerating device combining water and air mixing mechanisms, a wind-wheel, and an air-compressor operated by said wind-wheel for compressing the air prior to its coming in contact with the water, and a pipe for conveying the mixed water and air to the consumer, substantially as and for the purposes set forth.

10. In combination with the structure $a$, having a flooring $b$, and partitions beneath the same forming chambers $h$ and $i$, ejecting-tubes for mixing air and water, an air-duct $k$, chamber common to pumps $c\ c$, cog-wheels operating said pumps, shafts connected with said cog-wheels, and a wind-wheel, all said parts being arranged and combined substantially as and for the purposes set forth.

In testimony that I claim the foregoing I have hereunto set my hand this 18th day of September, 1888.

LEWIS S. CHICHESTER.

Witnesses:
   CHARLES H. PELL,
   CONSTANCE H. BALDWIN.